United States Patent [19]

Hazawa

[11] Patent Number: 4,891,809
[45] Date of Patent: Jan. 2, 1990

[54] CACHE MEMORY HAVING SELF-ERROR CHECKING AND SEQUENTIAL VERIFICATION CIRCUITS

[75] Inventor: Osamu Hazawa, Tokyo, Japan
[73] Assignee: NEC Corporation, Tokyo, Japan
[21] Appl. No.: 155,680
[22] Filed: Feb. 16, 1988
[30] Foreign Application Priority Data Feb. 16, 1987 [JP] Japan ............................... 62-31615

[51] Int. Cl.⁴ ............................................. G01R 11/22
[52] U.S. Cl. ........................................... 371/3; 371/23
[58] Field of Search .................... 371/3, 15, 16, 18, 20, 371/21, 49, 51, 23; 364/900 MS File

[56] References Cited

U.S. PATENT DOCUMENTS 4,686,621  8/1987  Keeley et al. ........................ 371/200

Primary Examiner—Jerry Smith
Assistant Examiner—Stephen M. Baker
Attorney, Agent, or Firm—Sughrue, Mion, Zinn, Macpeak & Seas

[57] ABSTRACT

A multilevel cache memory system has a pseudo-error indicating flag for storing a first logic state when the system is in a normal error checking mode and a second logic state when the system is in a pseudo-error verification mode. First logic gate circuits, associated respectively with the levels of the cache memory, are arranged to be disabled in response to the first logic state and enabled in response to the second logic state. Register stages corresponding in number to the levels of the cache memory stores level-invalidating data. Second logic gate circuits are associated respectively with the register stages for sequentially activating one of the first logic gate circuits in accordance with logic states of the register stages when the first logic gate circuits are enabled. Second flags are associated respectively with the first logic gate circuits to give an error indication in response to the activated first logic gate circuits.

1 Claim, 2 Drawing Sheets

CACHE MEMORY HAVING SELF-ERROR CHECKING AND SEQUENTIAL VERIFICATION CIRCUITS

BACKGROUND OF THE INVENTION

The present invention relates generally to cache memories, and more particularly to a cache memory system having a multilevel cache memory and a self-error checking circuit for invalidating one or more levels of the cache memory when a fault occurs in it and a verification circuit for verifying the error checking circuit by generating a pseudo-error.

The cache memory system of this type comprises a diagnostic unit and a multilevel cache memory unit which are connected by a plurality of interfacing lines on which pseudo-error indicating signals are applied from the diagnostic unit to the memory unit. The diagnostic unit of the known system includes a shift register for storing pseudo-error indicating logic states and an array of logic gates for combining the logic states with the logic state of a pseudo-error indicating flag and coupling the outputs of the logic gates through the interfacing lines as the pseudo-error indicating signals to the memory unit. However, the prior art would yield a substantial amount of hardware and interface if the cache memory has a large number of levels.

SUMMARY OF THE INVENTION

It is therefore an object of the present invention to provide a cache memory system having a normal error checking mode and a pseudo-error verification mode which simplifies the hardware and interfacing arrangements of the system.

This object is achieved by the provision of a sequential verification logic circuit for generating pseudo-error indicating signals in sequence within the cache memory unit.

Specifically, the cache memory system of the invention comprises a multilevel cache memory, a pseudo-error indicating flag for storing a first logic state when the system is in a normal error checking mode and a second logic state when the system is in a pseudo-error verification mode. A plurality of first logic gate circuits, associated respectively with the levels of the cache memory, are arranged to be disabled in response to the first logic state and enabled in response to the second logic state. A register having a plurality of stages corresponding in number to the levels of the cache memory stores level-invalidating data. A plurality of second logic gate circuits are associated respectively with the register stages for sequentially activating one of the first logic gate circuits in accordance with logic states of the register stages when the first logic gate circuits are enabled. A plurality of second flags are associated respectively with the first logic gate circuits to give an error indication in response to the activated first logic gate circuits.

BRIEF DESCRIPTION OF THE DRAWINGS

The present invention will be described in further detail with reference to the accompanying drawings, in which.

DETAILED DESCRIPTION

Figure 1:
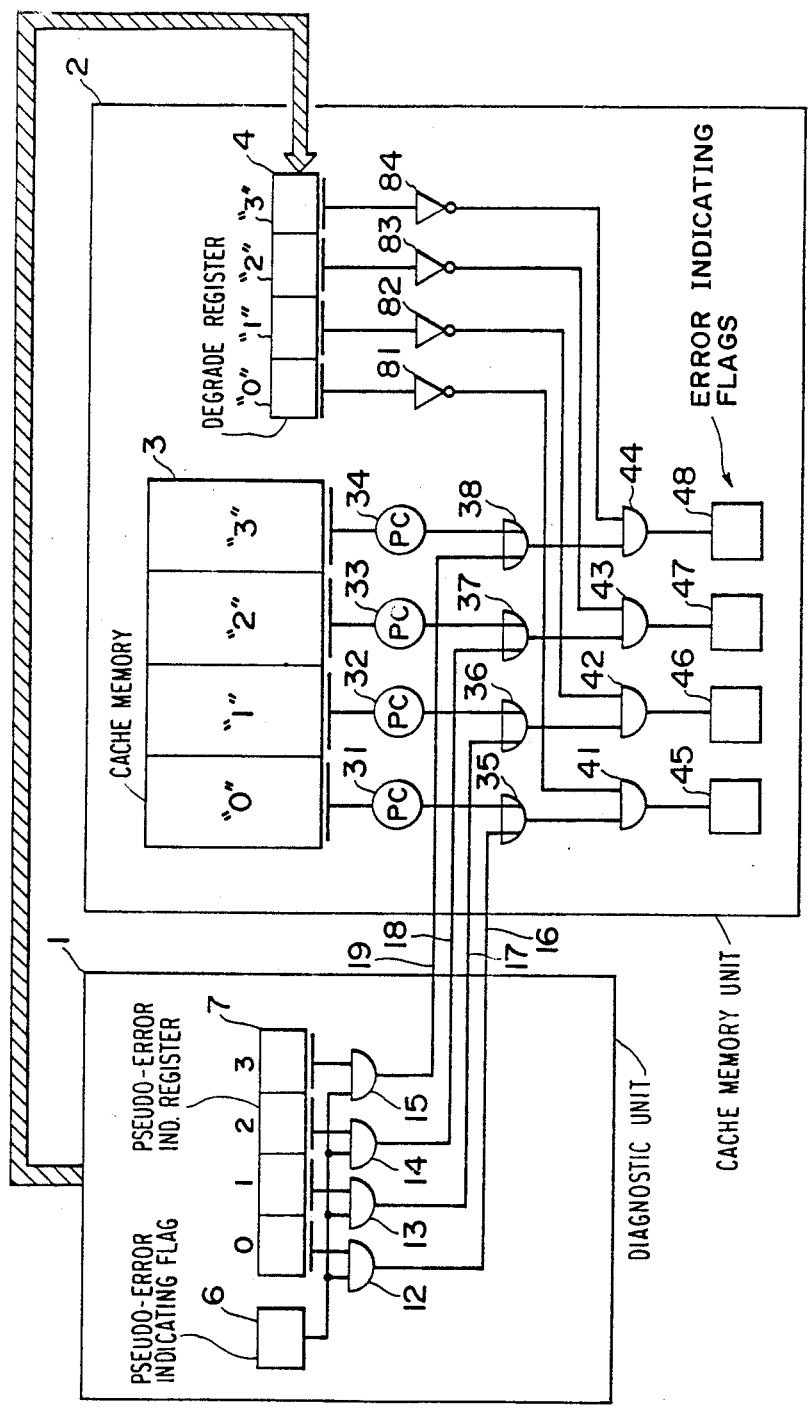
FIG. 1 is a circuit diagram of a prior art cache memory system.

Before describing the present invention, reference is first made to FIG. 1 in which a portion of a prior art cache memory system is shown as comprising a diagnostic unit 1 and a cache memory unit 2 which are connected by leads 16, 17, 18 and 19. The diagnostic unit 1 includes a pseudo-error indicating flag 6 and a four-level pseudo-error indicating register 7 and the cache memory unit 2 includes a four-level cache memory 3 and a four-level degrade register 4. During normal operating mode in error processing function operates in accordance with parity checkers 31 through 34, the pseudo-error indicating flag 6 and the contents of pseudo-error indicating register 7 are all set equal to logic 0, with the outputs of AND gates 12 through 15 being set to logic 0. The contents of degrade register 4 are all set equal to logic 0, indicating that all levels of the cache memory 3 are currently in use. Inverters 81 through 84 generate logic-1 outputs, enabling AND gates 41 through 44 to the outputs of which are connected error indicating flags 45 through 48, respectively. Parity checkers 31, 32, 33 and 34, connected to the cache memory 3, deliver their outputs through OR gates 35, 36, 37 and 38 to AND gates 41, 42, 43 and 44, respectively. Since these AND gates have been enabled by the logic-1 outputs of inverters 81 through 84, the outputs of parity checkers 31 through 34 are applied to error indicating flags 45 through 48, respectively. In this way, data on each of the levels of cache memory 3 can be checked for error.

During pseudo-error verification mode, the error check function of the diagnostic system is verified by generating a pseudo-error in one of the levels of cache memory 3 by setting the level "0" of register 7 and the flag 6 equal to logic 1. The output of AND gate 16 switches to logic 1 and hence the error indicating flag 45 switches to logic 1, indicating that a parity error exists in level "0" to cause an error processing circuit, not shown, to initiate its function so that it can be tested whether such circuit is functioning properly. Diagnostic unit 1 then writes a logic 1 into the level "0" of degrade register 4 to disable the AND gate 41 to prevent the error indicating flag 45 from giving a parity error indication of level "0".

The outputs of degrade register 4 are further coupled to a hit control unit (not shown) of the cache memory 3 to prevent any of the logic-1 storing levels of degrade register 4 from being hit. By inserting a logic-1 into the level "0" of degrade register 4, the level "0" is said to be isolated from the memory system. Diagnostic unit 1 performs similar actions with respect to levels "1", "2" and "3" by storing a logic 1 into the levels "1", "2" and "3" of register 7 to check to see if the error processing function of the system is operating properly.

It is seen that the prior art system requires as many levels in the pseudo-error indicating register 7 and as many interconnecting leads between units 1 and 2 as there are levels in the cache memory 3. Thus, one disadvantage of the prior art is that it results in a system having a substantial amount of hardward and interface.

Figure 2:
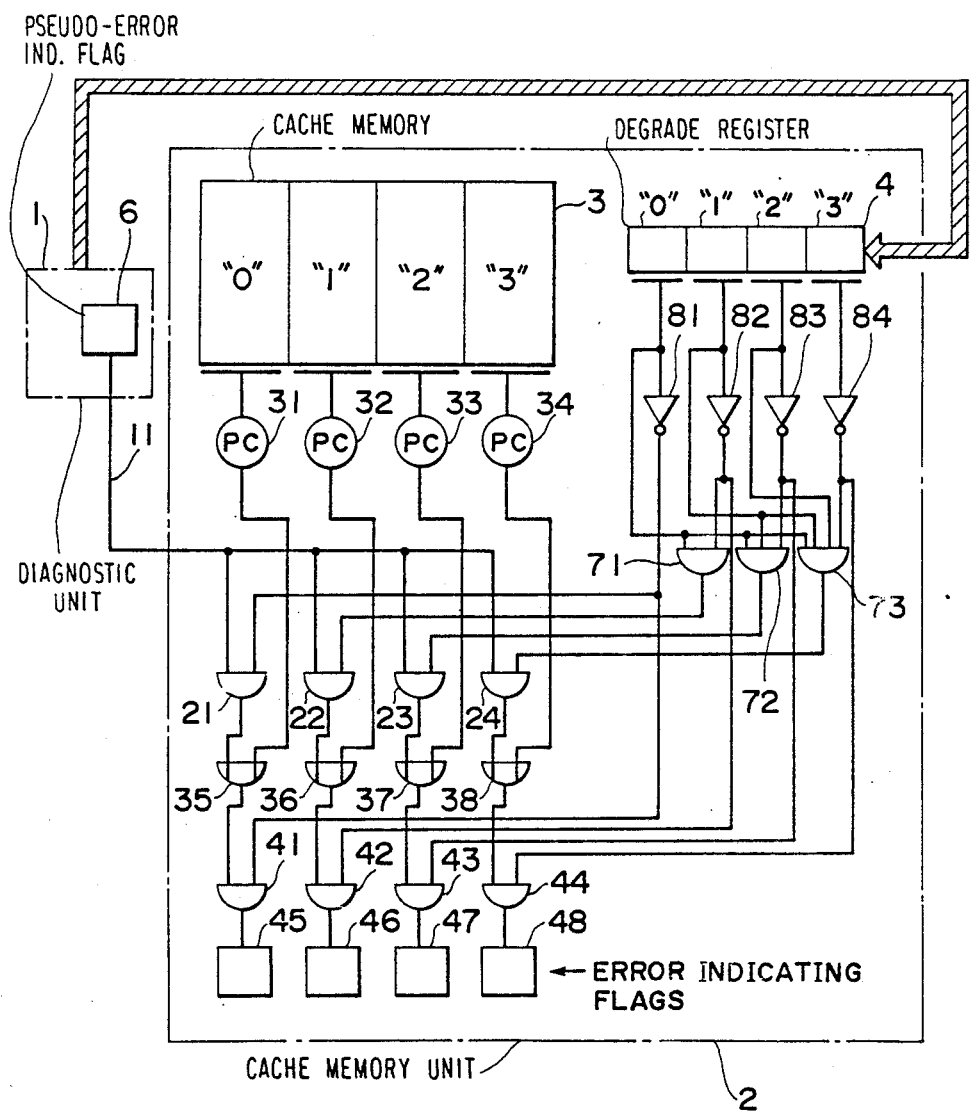
FIG. 2 is a circuit diagram of a cache memory system of the present invention.

Referring to FIG. 2, there is shown a cache memory system of the present invention, wherein same numerals are used to designate parts corresponding to those of FIG. 1. The cache memory system of the invention differs from the prior art system in that the pseudo-error indicating register 7 and its associated connecting lines 16 through 19 are removed and a sequential logic circuit is formed by AND gates 21 through 24, 71 through 73. Specifically, the output of level "0" of degrade register 4 is connected to first input terminals of AND gates 71, 72 and 73, the output of level "1" of register 4 is connected to second input terminals of AND gates 72 and 73, and the output of level "3" of register 4 is connected to a third input terminal of AND gate 73. The outputs of inverters 82, 83 and 84 are respectively connected to the second, third and fourth input terminals of AND gates 71, 72 and 73. Pseudo-error indicating flag 6 is connected by a lead 11 to the first input terminals of AND gates 21, 22, 23 and 24. The outputs of inverter 81, AND gates 71, 72 and 73 are connected respectively to the second input terminals of AND gates 21, 22, 23 and 24. The outputs of AND gates 21, 22, 23 and 24 are connected to OR gates 35, 36, 37 and 38, respectively, instead of the removed connecting leads 16, 17, 18 and 19.

The operation of the circuit of FIG. 2 is as follows. During normal error checking mode, the pseudo-error indicating flag 6 and all the levels of degrade register 4 are all set equal to logic 0, enabling AND gates 41 through 44 to pass the outputs of associated parity checkers 31 through 34 to error indicating flags 45 through 48 as in the prior art system.

During pseudo-error verification mode, a logic 1 is set into the flag 6 to enable AND gates 21 through 24 and all the levels of degrade register 4 are initially set equal to logic 0, producing logic-0 outputs from AND gates 71 through 73 and logic-1 outputs from inverters 81 through 84 to enable AND gates 41 through 44. Thus, AND gate 21 is first activated, generating a logic-1 output which is passed through OR gate 35 and AND gate 44 to the error indicating flag 45 to give an indication that level "0" is in error, while the outputs of AND gates 22 through 24 and hence AND gates 42 through 44 remain at 35 logic 0.

Diagnostic unit 1 stores a logic 1 into the level "0" of degrade register 4 and signals the hit control unit of cache memory 3 to invalidate the levels "0" cache memory 3 and register 4. The output of inverter 81 now switches to logic 0, disabling AND gate 41 and AND gate 71 is activated, producing a logic-1 output which in turn activates AND gate 22, producing a logic-1 output. This logic-1 output is passed through OR gate 36 and AND gate 42 to the error indicating flag 46 to give an indication that an error has occurred at level "1" of cache memory 3.

It is seen therefore that with a logic 1 being stored in flag 6, the setting of all levels of degrade register 4 to logic 0 activates AND gates 21 and 41 to indicate the presence of an error at level "0" of cache memory 3 and updating the level "0" with logic 1 deactivates AND gates 21 and 41 and activates AND gates 71, 22 and 42 to indicate the presence of an error at level "1" of the cache memory. Likewise, updating the levels "0" and "1" of register 4 with logic 1 deactivates AND gates 71, 22 and 42 and activates AND gates 72, 23 and 43, causing a level-2 error indication to issue from flag 47, and updating the levels "0", "1" and "2" of register 4 with logic 1 deactivates AND gates 72, 23 and 43 and activates AND gates 73, 24 and 44, causing a level-3 error indication to issue from flag 48.

It is thus seen that with the provision of the sequential logic circuit described above, the amount of hardware and and the amount of interface between dianostic unit 1 and cache memory unit 2 can be reduced.

What is claimed is:

1. A cache memory system comprising:
   a cache memory having a plurality of levels;
   a first flag for storing a first logic state when said system is in a normal error checking mode and a second logic state when said system is in a pseudo-error verification mode;
   a register having a plurality of stages corresponding in number to said levels of said cache memory for storing level-invalidating data;
   a plurality of first logic gate means associated respectively with said levels of said cache memory, said first logic gate means being arranged to be disabled in response to said first logic state and enabled in response to aid second logic state for generating a pseudo-error in one of the levels of said cache memory specified by contents of said register;
   a plurality of second logic gate means associated respectively with the register stages for sequentially activating each of said first logic gate means one at a time in accordance with logic states of the register stages when said first logic gate means are enabled;
   a plurality of second flags associated respectively with said first logic gate means to give an error indication in response to the activated first logic gate means; and
   a plurality of parity check circuits connected respectively to said levels of said cache memory,
   wherein said first logic gate means comprise:
   an array of first AND gates associated respectively with said levels of said cache memory, said first AND gates being arranged to be disabled in response to said first logic state and enabled in response to said second logic state;
   an array of OR gates;
   an array of second AND gates associated respectively with said parity check circuits and outputs of said first AND gates by way of said OR gates, said second flags being connected respectively to outputs of said second AND gates,
   wherein said second logic gate means comprise:
   a first logic circuit for activating respectively said first AND gates in accordance with the logic states of said register stages when said first AND gates are enabled; and
   a second logic circuit for enabling said second AND gates respectively in accordance with the logic states of said register stages.

* * * * *

UNITED STATES PATENT AND TRADEMARK OFFICE
CERTIFICATE OF CORRECTION

PATENT NO. : 4,891,809

DATED : January 2, 1990

INVENTOR(S) : Osamu HAZAWA

It is certified that error appears in the above-identified patent and that said Letters Patent is hereby corrected as shown below:

Col. 2, line 61, delete "hardward" and insert --hardware--.

Signed and Sealed this

Second Day of April, 1991

Attest:

HARRY F. MANBECK, JR.

*Attesting Officer*  *Commissioner of Patents and Trademarks*